US 8,094,939 B2

(12) United States Patent
Zhang et al.

(10) Patent No.: US 8,094,939 B2
(45) Date of Patent: Jan. 10, 2012

(54) DIGITAL INK-BASED SEARCH

(75) Inventors: Dongmei Zhang, Redmond, WA (US);
Xiaohui Hou, Beijing (CN); Yingjun Qiu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 11/821,837

(22) Filed: Jun. 26, 2007

(65) Prior Publication Data

US 2009/0003658 A1    Jan. 1, 2009

(51) Int. Cl.
*G06K 9/18* (2006.01)

(52) U.S. Cl. ......... 382/185; 382/187; 382/198; 382/202

(58) Field of Classification Search .................. 382/305, 382/292, 185, 187, 198, 202
See application file for complete search history.

(56) References Cited

U.S. PATENT DOCUMENTS

| | | | |
|---|---|---|---|
| 5,445,901 A * | 8/1995 | Korall et al. ................. | 429/406 |
| 5,500,937 A | 3/1996 | Thompson-Rohrlich | |
| 5,613,019 A | 3/1997 | Altman | |
| 5,666,438 A | 9/1997 | Beernink et al. | |
| 5,680,480 A | 10/1997 | Beernink et al. | |
| 5,687,254 A * | 11/1997 | Poon et al. ................... | 382/229 |
| 5,742,705 A | 4/1998 | Parthasarathy | |
| 5,784,504 A | 7/1998 | Anderson et al. | |
| 5,796,867 A | 8/1998 | Chen | |
| 5,832,474 A * | 11/1998 | Lopresti et al. ...................... | 1/1 |
| 6,173,253 B1 | 1/2001 | Abe et al. | |
| 6,240,424 B1 | 5/2001 | Hirata | |
| 6,263,113 B1 | 7/2001 | Abdel-Mottaleb et al. | |
| 6,333,995 B1 * | 12/2001 | Perrone ......................... | 382/187 |
| 6,389,435 B1 | 5/2002 | Golovchinsky et al. | |
| 6,415,256 B1 | 7/2002 | Ditzik | |
| 6,512,995 B2 | 1/2003 | Murao | |
| 6,549,675 B2 * | 4/2003 | Chatterjee ..................... | 382/244 |
| 6,552,719 B2 | 4/2003 | Lui et al. | |
| 6,625,335 B1 * | 9/2003 | Kanai ............................ | 382/306 |
| 6,681,044 B1 * | 1/2004 | Ma et al. ....................... | 382/185 |
| 6,813,395 B1 | 11/2004 | Kinjo | |
| 6,965,384 B2 | 11/2005 | Lui | |

(Continued)

FOREIGN PATENT DOCUMENTS

KR    10-1993-0001471    2/1993

(Continued)

OTHER PUBLICATIONS

Face Photo recognition—Sketch, Tang et al., IEEE, 0-7803-7622-6, 2002, pp. I-257-I-260.*

(Continued)

*Primary Examiner* — Jayesh A Patel

(57) ABSTRACT

Described is searching directly based on digital ink input to provide a result set of one or more items. Digital ink input (e.g., a handwritten character, sketched shape, gesture, drawing picture) is provided to a search engine and interpreted thereby, with a search result (or results) returned. Different kinds of digital ink can be used as search input without changing modes. The search engine includes a unified digital ink recognizer that recognizes digital ink as a character or another type of digital ink. When the recognition result is a character, the character may be used in a keyword search to find one or more corresponding non-character items, e.g., from a data store. When the recognition result is a non-character item, the non-character item is provided as the result, without keyword searching. The search result may appear as one or more item representations, such as in a user interface result panel.

20 Claims, 11 Drawing Sheets

U.S. PATENT DOCUMENTS

| | | | |
|---|---|---|---|
| 7,031,555 B2 | 4/2006 | Troyanker | |
| 7,050,632 B2 | 5/2006 | Shilman | |
| 7,123,770 B2 * | 10/2006 | Raghupathy et al. | 382/202 |
| 7,136,082 B2 | 11/2006 | Saund | |
| 7,167,585 B2 | 1/2007 | Gounares et al. | |
| 7,171,060 B2 | 1/2007 | Park et al. | |
| 7,302,099 B2 * | 11/2007 | Zhang et al. | 382/186 |
| 7,369,702 B2 * | 5/2008 | Abdulkader et al. | 382/187 |
| 7,526,129 B2 * | 4/2009 | Bargeron | 382/179 |
| 7,630,554 B2 | 12/2009 | Napper et al. | |
| 7,756,755 B2 * | 7/2010 | Ghosh et al. | 705/26.1 |
| 2002/0087426 A1 * | 7/2002 | Shiitani et al. | 705/26 |
| 2002/0090148 A1 * | 7/2002 | Pass et al. | 382/305 |
| 2002/0150297 A1 * | 10/2002 | Gorbatov et al. | 382/202 |
| 2003/0007683 A1 * | 1/2003 | Wang et al. | 382/159 |
| 2003/0086627 A1 | 5/2003 | Berriss et al. | |
| 2003/0123733 A1 * | 7/2003 | Keskar et al. | 382/187 |
| 2003/0167274 A1 * | 9/2003 | Dettinger et al. | 707/100 |
| 2004/0017946 A1 * | 1/2004 | Longe et al. | 382/185 |
| 2004/0073572 A1 * | 4/2004 | Jiang | 707/104.1 |
| 2004/0252888 A1 | 12/2004 | Bargeron et al. | |
| 2005/0060324 A1 * | 3/2005 | Johnson et al. | 707/100 |
| 2005/0091576 A1 | 4/2005 | Relyea et al. | |
| 2005/0100214 A1 * | 5/2005 | Zhang et al. | 382/179 |
| 2005/0102620 A1 | 5/2005 | Seto | |
| 2005/0201620 A1 | 9/2005 | Kanamoto et al. | |
| 2005/0222848 A1 | 10/2005 | Mapper et al. | |
| 2005/0281467 A1 * | 12/2005 | Stahovich | 382/202 |
| 2006/0001667 A1 | 1/2006 | LaViola | |
| 2006/0007188 A1 * | 1/2006 | Reiner | 345/179 |
| 2006/0031755 A1 * | 2/2006 | Kashi | 715/512 |
| 2006/0036577 A1 | 2/2006 | Knighton et al. | |
| 2006/0045337 A1 | 3/2006 | Shilman et al. | |
| 2006/0050969 A1 | 3/2006 | Shilman et al. | |
| 2006/0062461 A1 | 3/2006 | Longe et al. | |
| 2006/0110040 A1 | 5/2006 | Simard et al. | |
| 2006/0126936 A1 | 6/2006 | Bhaskarabhatla | |
| 2006/0149549 A1 | 7/2006 | Napper | |
| 2006/0197763 A1 | 9/2006 | Harrison et al. | |
| 2006/0209040 A1 | 9/2006 | Garside | |
| 2006/0277159 A1 | 12/2006 | Napper et al. | |
| 2007/0003142 A1 | 1/2007 | Simard et al. | |
| 2009/0002392 A1 | 1/2009 | Hou | |
| 2009/0003703 A1 | 1/2009 | Zhang | |
| 2009/0007272 A1 * | 1/2009 | Huang et al. | 726/26 |

FOREIGN PATENT DOCUMENTS

| | | | |
|---|---|---|---|
| WO | WO 03/034276 A1 | 4/2003 | |
| WO | WO 03034276 A1 * | 4/2003 | |

OTHER PUBLICATIONS

International Search Report and Written Opinion Received for PCT Application No. PCT/US2008/068251, mailed on Nov. 28, 2008, 11 pages.

"Shape-searching software helps to avoid wasted design effort", Date: Jun. 21, 2007, http://www.engineerlive.com/features/17264/shapesearching-software-helps-to-avoid-wasted-design-effort.thtml.

Behiels, G., et al., "Statistical shape model-based segmentation of digital X-ray images", Date: 2000, pp. 61-68.

Tang, et al., "Face photo recognition using sketch", Date: 2002, vol. 1, pp. I-257-I-260.

International Search Report and Written Opinion; PCTUS2008/068252; dated Dec. 31, 2008.

Kevin Durdle, "Supporting Mathematical Handwriting Recognition through an Extended Digital Ink Framework", Date: 2003.

Saund, et al., "A Perceptually-Supported Sketch Editor", Proceedings of the 7th annual ACM symposium on User Interface software and technology, ACM Press, New York, USA, Date: 1994, pp. 175-184.

Wu Xiaojie, "Achieving Interoperability of Pen Computing with Heterogenous Devices and Digital Ink Formats", Date: Dec. 2004.

"CalliGrapher® 8.4 User's Guide"; 1997; pp. 1-127; PhatWare Corp.

"The Evolution of Tablet PC Technologies in Microsoft Windows Vista"; 2005; pp. 1-4.

Hse, et al.; "Recognition and Beautification of Multi-Stroke Symbols in Digital Ink"; 2002; pp. 1-7; American Association for Artificial Intelligence.

International Search Report and Written Opinion; PCTUS2008/068252; dated Dec. 31, 2008.

* cited by examiner

DIGITAL INK-BASED SEARCH

CROSS-REFERENCE TO RELATED APPLICATIONS

The present application is related to the following copending U.S. patent applications, assigned to the assignee of the present application, filed concurrently herewith and hereby incorporated by reference: "Integrated Platform for User Input of Digital Ink," U.S. patent application Ser. No. 11/821,870, and "Unified Digital Ink Recognition," U.S. patent application Ser. No. 11/821,858.

BACKGROUND

Digital ink is becoming an important media for users to interact with computer applications. However, traditional search technologies are usually based on text, not on digital ink.

While text-based searching is often valuable, there are many kinds of data and information that cannot be described accurately and/or easily by text, such as shapes and sketches. For example, consider a user that wants to find a certain shape from a program's shape repository. The user may not know the program's text name for the shape, and thus may have trouble finding that shape, even though the user can easily sketch a similar shape easily with digital ink. Similarly, a sketch or other image/picture (e.g., a Word Art item) may be found via a text search with the appropriate text, but if the needed text is not known or intuitive to a user, a text search is not an effective way to find what the user wants.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which digital ink received as input is used to search for non-character items (e.g., shapes) corresponding to the digital ink. Digital ink is sent to a unified digital ink recognizer that returns a recognition result as a character or another type of digital ink. When the recognition result is a character, the character is used in a keyword search to find one or more corresponding non-character items, e.g., from a data store. When the recognition result is a non-character item, the non-character item is provided as the search result, without keyword searching. In addition to shapes, other non-character items include handwritten gestures or drawn pictures.

For example, if the recognizer returns a character, the keyword search may return any item in which that character appears. Alternatively, the character can be used to build the keyword for a search. If instead the recognizer returns a non-character item such as a shape, the item may be used as the search result. The search result may appear as one or more visible representations of the corresponding item or items, such as in a result panel associated with a user interface into which the digital ink was input. Alternatively, the search result may be provided as corresponding information to a software program for which the item is being searched.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards digital ink based search technology that can be used to find items such as shapes, sketches and so forth efficiently and naturally. In one aspect, digital ink is used as input to search information directly. For example, as is known, digital ink is input naturally by user's handwriting, and can be used to represent different kinds of information intuitively and effectively. As will be understood, the advantages of digital ink input are leveraged herein to make digital ink-based searching more intuitive, natural, effective and efficient in certain areas relative to text based searching.

While various examples herein are primarily directed to differentiating between characters and shapes to search for shapes, such as with respect to a diagramming program such as Microsoft® Visio®, any handwritten input may be differentiated and/or benefit from the search technology described herein, including handwritten characters, sketched shapes, handwritten gestures and/or drawn pictures or the like. Further, while an example implementation of a unified digital ink recognizer is described herein that can among other aspects differentiate between characters and shapes, other implementations of a unified digital ink recognizer may be used.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, and digital ink in general.

Example Unified Digital Ink Recognizer

As described below with reference to FIGS. 1-4, a unified digital ink recognizer 102 is built. As part of the building process, a dataset of items that are to be recognized by the recognizer 102 is defined. For example, one such dataset comprises a set of Chinese characters and shapes, and contains 9,119 Chinese characters, corresponding to the Unicode range from 0x4e00 to 0x9FA5 (seldom used characters are removed), along with other custom shapes, corresponding to FIGS. 5-14, respectively. Further example shapes that may be recognized are represented in the aforementioned U.S. patent application entitled "Unified Digital Ink Recognition."

For the shape set, the private use area of Unicode that can be customized, ranging from Unicode 0xF000 to 0xF0FF, is used. For building a unified digital ink recognizer, any item to be recognized can be assigned with a Unicode value from the private use area of Unicode, although an item with an already-assigned Unicode values (e.g., a character) can use that value.

Figure 1:
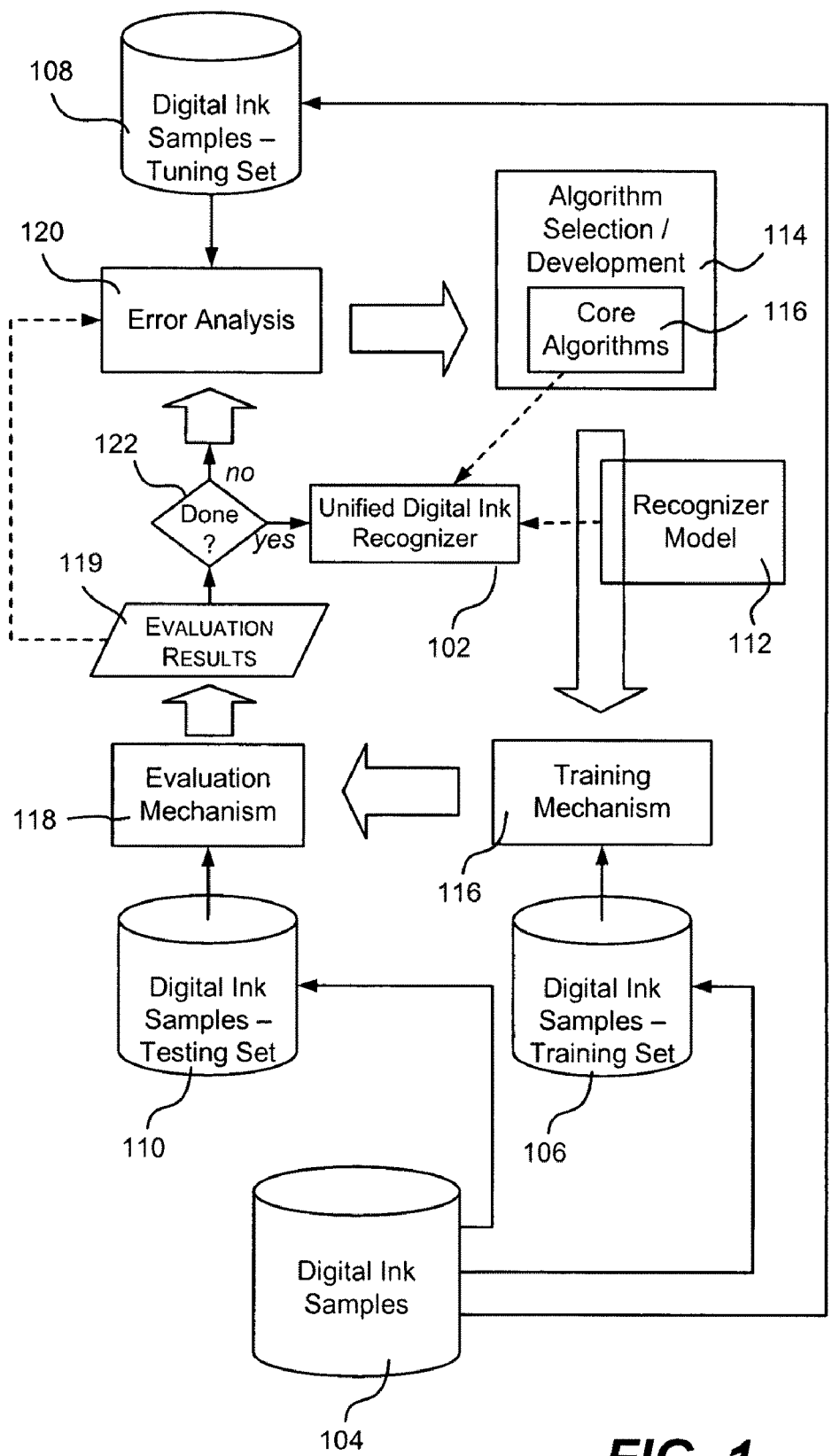
FIG. 1 is a block diagram representative of example components used to build a unified digital ink recognizer.

To build the unified digital ink recognizer 102, a learning based pattern recognition approach is used, as generally represented by the example components shown in FIG. 1. In general, this approach builds a classifier according to the features of different classes of items to be recognized. Via feature extraction, the features of each class of items are extracted from a collection of samples for that class.

With the classifier, given a new item to be recognized, the features of the item are matched with the feature of an existing class, which means the new item is recognized as belonging to that class.

One aspect of building a digital ink recognizer 102 with this approach is data collection of digital ink samples for each item in the defined dataset to be recognized by the digital ink recognizer 102. In the implementation represented in FIG. 1, the digital ink samples 102 are divided into three different datasets, comprising a training set 106, a testing set 110 and a tuning set 108. The training set 106 is used for building a recognizer model 112, the testing set 110 for evaluating the recognizer model 112, and the tuning set 108 for tuning the recognizer model 112 to improve its accuracy. In one example implementation, for building the recognizer model 112, five-hundred digital ink samples of handwriting were collected for each Chinese character in the training set, and one-hundred digital ink sketch samples were collected for each shape in the training set.

Based on the digital ink samples 104, a first mechanism (process step) 114 develops and/or selects a set of one or more core algorithms 116 for use in extracting the features of the training set 106 to build the digital ink recognizer model 112 according to the extracted features. The developed core algorithms are performed on the training set 106 to build the digital ink recognizer model 112.

Figure 2:
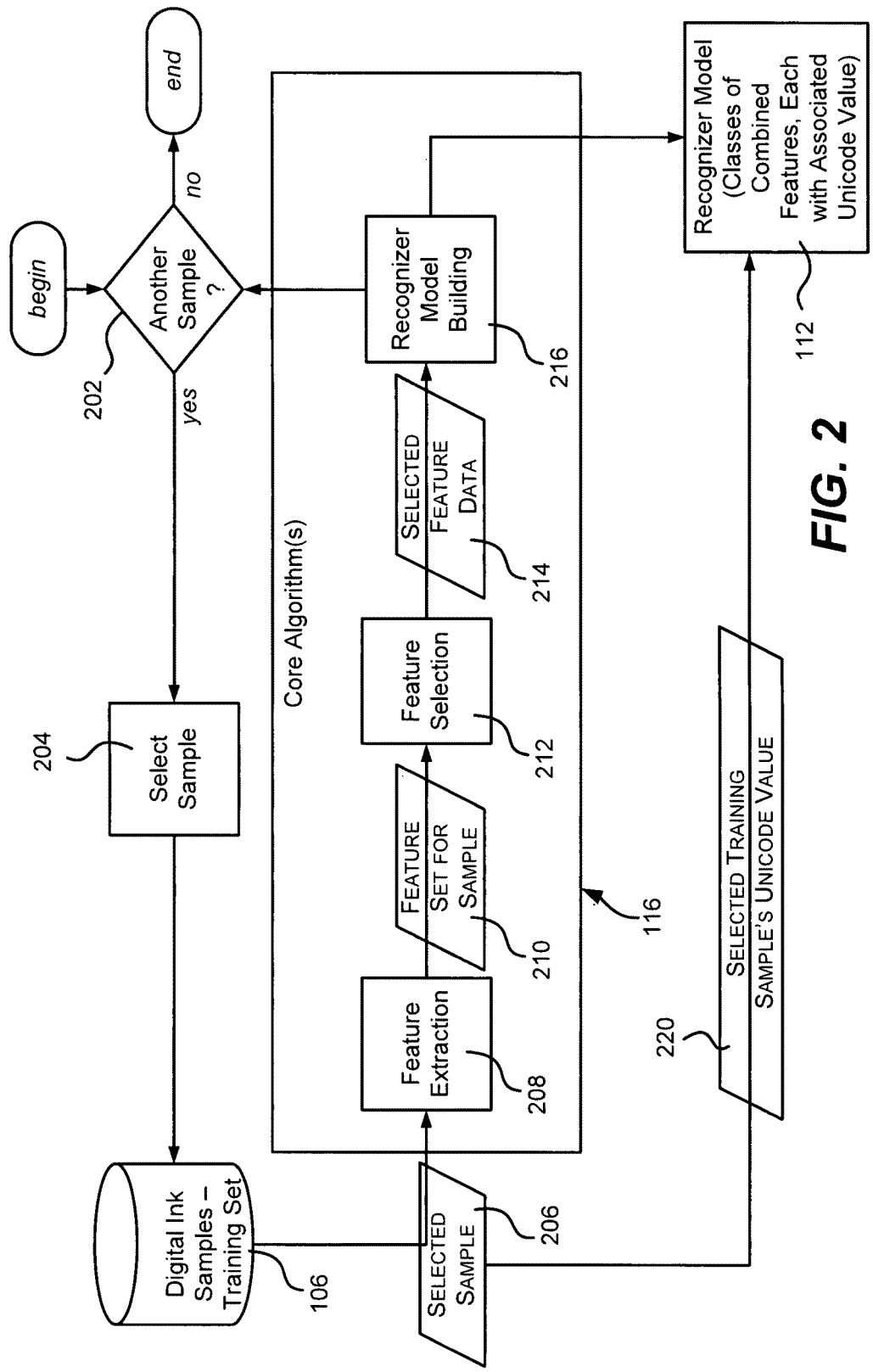
FIG. 2 is a block diagram representative of example components within a set of one or more core algorithms that may be used in building a unified digital ink recognizer.

More particularly, a recognition algorithm is used to build the recognizer model (classifier) 112 for the items to be recognized. As represented in FIG. 2 via blocks 202 and 204, for each selected training sample 206 of a set of training samples 106, the core algorithm 116 includes a feature extraction mechanism 208 that extracts a set of features 210. Further processing 212 may be performed on the feature set 210, such as feature selection (e.g., for nearest neighbor recognition, described below with reference to FIG. 3) into selected feature set 214. The feature set 214 is then combined with other such feature data for this sample's class to build (block 216) the recognizer model 112, by adjusting the combined feature data of the class to which this sample belongs based on the feature set 214.

As is known, there are many existing and possible recognition algorithms which may be used to build a recognition system, including nearest neighbor classification (sometimes referred to as k-nearest neighbor, or KNN), Gaussian Mixture Model (GMM), Hidden Markov Model (HMM), and so forth.

In one implementation of the unified digital ink recognition system, nearest neighbor classification is used to recognize digital ink.

Figure 3A:
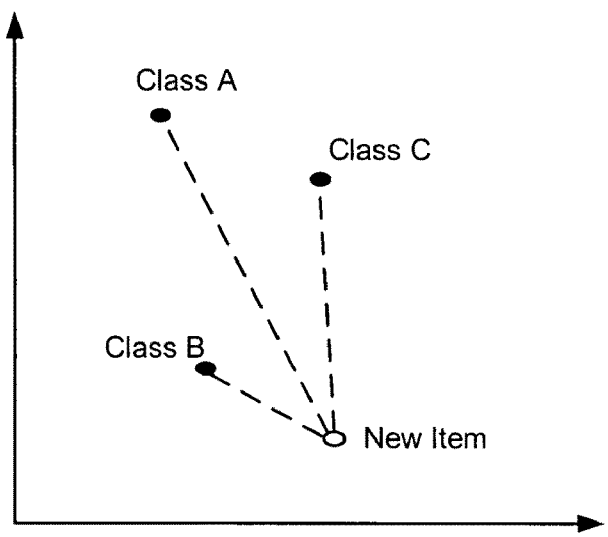
FIG. 3A is a visual representation of a core algorithm that recognizes a new item via nearness to a class within a recognition model built during training.

A primary concept in nearest neighbor classification is to use one point in multi-dimensional space to represent each class of samples, such as classes A-C as generally represented in FIG. 3A. In such an example, the class data is thus a set of coordinates in multiple (two or more) dimensional space.

Figure 3B:
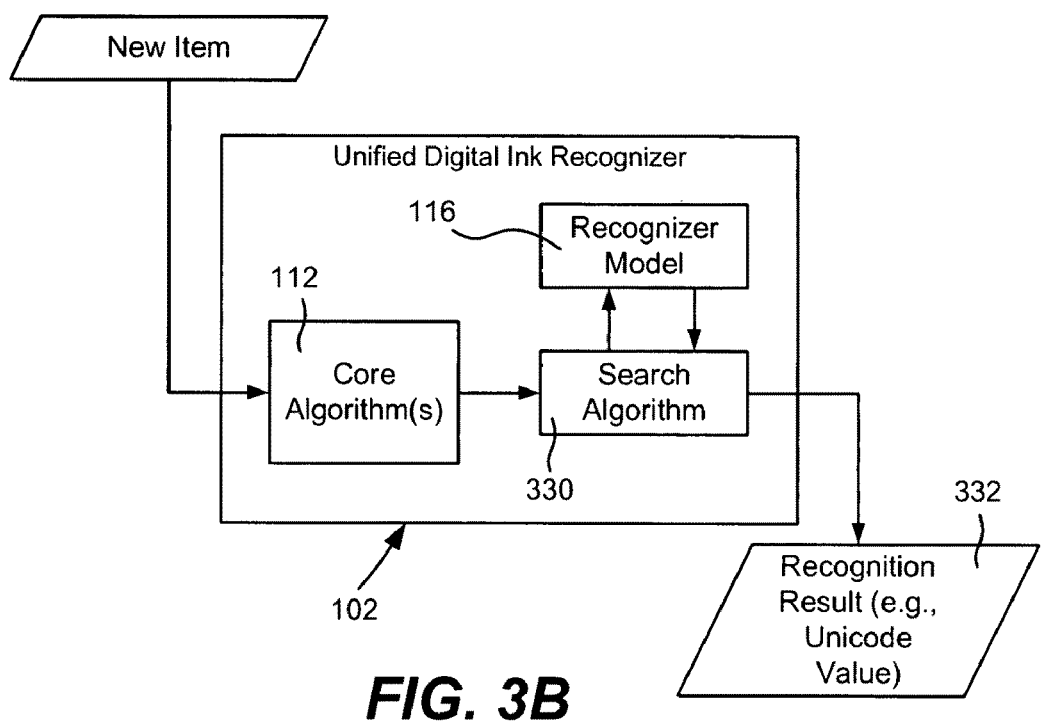
FIG. 3B is a block diagram representing recognition of a new item.

After the recognizer model 112 is built, when a new item "New Item" is to be recognized, that item is also represented by a point in this space. As represented in FIG. 3B, a search algorithm 330 performs computations (e.g., searches for a nearest neighbor) to find the nearest point relative to this new item's point, and recognizes this item as belonging to the class that is represented by the found search result, whereby the recognition result 332 (e.g., a Unicode value) is output. In the example of FIG. 3A, (in which only three classes are shown, and in only two dimensions for purposes of simplicity), it is readily apparent that the new item is nearest to the Class B, and thus would be recognized as whatever Unicode value corresponded to the Class B.

Returning to FIG. 1, the accuracy and efficiency of the unified digital ink recognizer model 112 may be evaluated via an evaluation mechanism 118 that operates using the testing set 116 of digital ink samples. Further, according to the evaluation results 119, some error analysis may be performed (block 120), by which the unified recognizer model 112 may be improved with the tuning set of digital ink samples 108. As represented via decision diamond 122, the process may be performed over and over to optimize the accuracy and efficiency of the unified recognizer model 112, until, for example, the evaluation results indicate an acceptable recognizer.

When complete, a unified digital ink recognizer 102 is provided, comprising the core algorithm or algorithms and the recognizer model 112. In one implementation, the unified digital ink recognizer can recognize digital ink of handwriting (e.g., Chinese characters) and sketching shapes (including sketched graphs). As a result, whether the user inputs a Chinese character by handwriting or inputs a shape by sketching, the unified digital ink recognizer correctly interprets the digital ink of the user's input as a character or as a shape.

Figure 4:
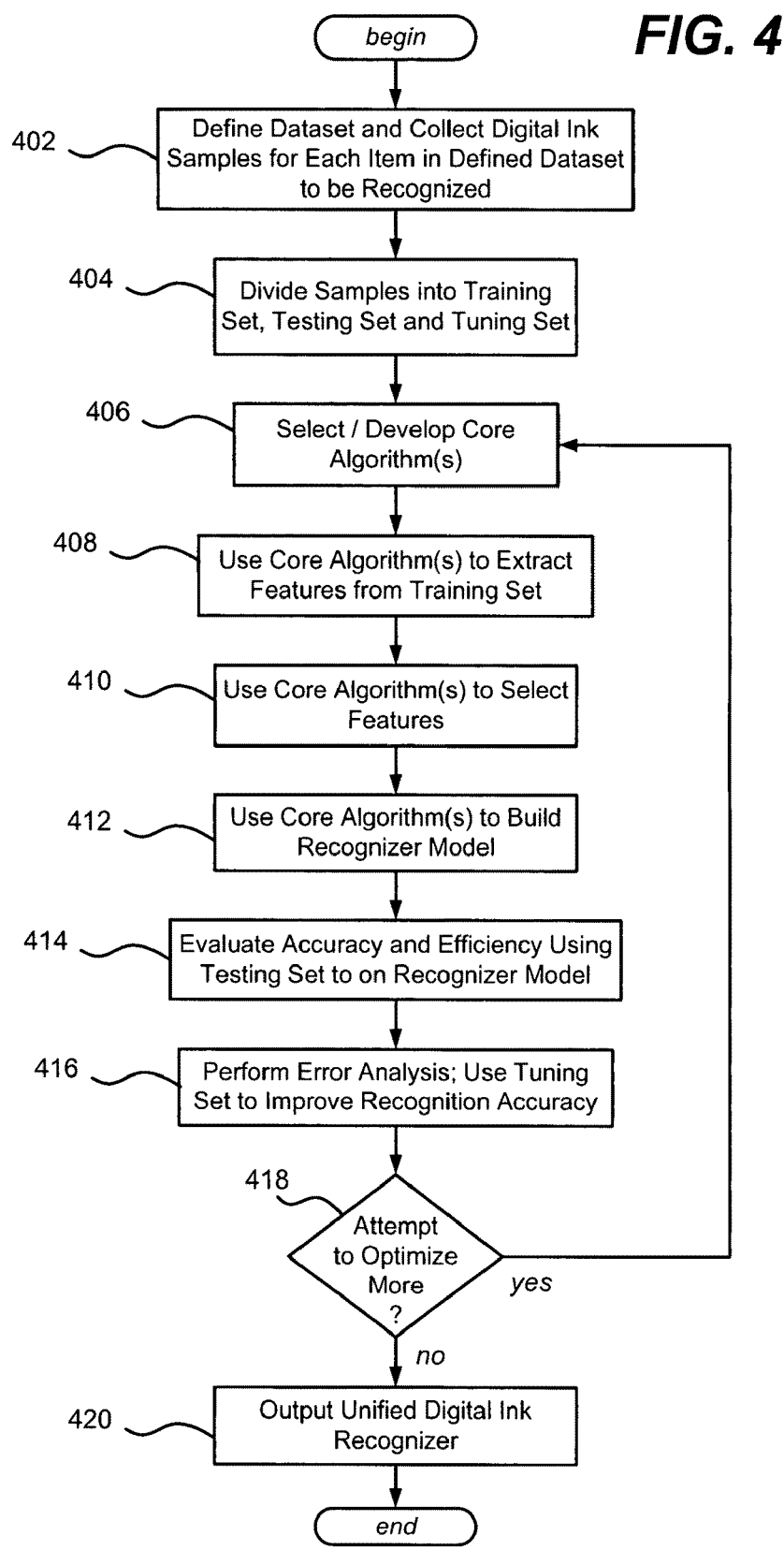
FIG. 4 is a flow diagram representing example steps that may be taken when building a unified digital ink recognizer.
Figure 5:
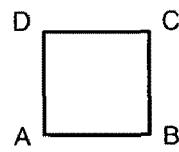
FIGS. 5-14 are representations of some example items that may be recognized from a sketch via a unified digital ink recognizer.
Figure 6:
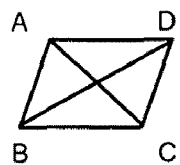
Figure 7:
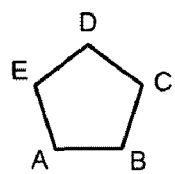
Figure 8:
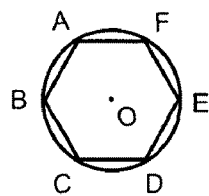
Figure 9:
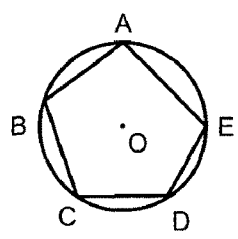
Figure 10:
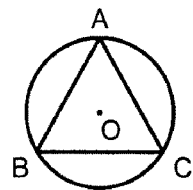
Figure 11:
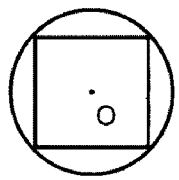
Figure 12:
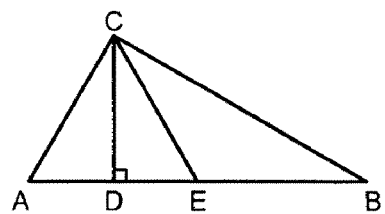
Figure 13:
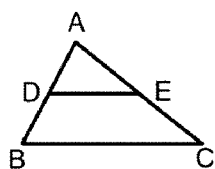
Figure 14:
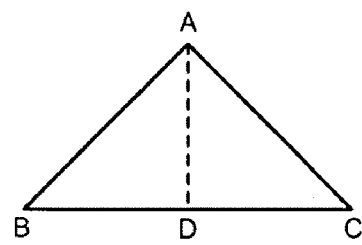

FIG. 4 summarizes how the unified digital ink recognition technology is built so as to uniformly recognize different kinds of information represented by digital ink, beginning at step 402 which represents defining the dataset of items to be recognized, and collecting the digital ink samples for those items. Step 404 represents dividing the digital ink samples into the training set, testing set and tuning set. Note that the samples may be divided randomly, or based on some other criteria, such as to put similar looking items in the tuning set. Step 406 represents selecting the core algorithms, e.g., determining which features to extract, and for nearest neighbor classification, which should be selected from those features, how much weight to give each feature, and so forth.

Step 408 represents using a feature extraction algorithm to extract the features from each selected item in the training set, with step 410 representing the feature selection algorithm, and step 412 representing the building of the recognizer model, e.g., processing the feature data of each selected item as needed to adjusting the feature data for the class [the class is identified by the Unicode value, the selected item is belonging to the class] in the recognizer model (such as representing multi-dimensional coordinates).

Step 414 represents the evaluation of the accuracy and/or efficiency using the testing set of digital ink samples. Based on an error analysis at step 416 as to how accurate and/or efficient the model is, samples from the tuning set may be applied at step 416 in an attempt to better optimize the recognizer. Step 418 represents repeating any or all of steps 406, 408, 410, 412, 414 and 416 for further optimization. Note that the evaluation at step 414 may be used to determine whether further optimization is necessary. Further, note that a model that is less accurate and/or efficient than another model may be discarded until the best model of those evaluated is determined.

Digital Ink-Based Search

Turning to FIGS. 15-20, there is exemplified therein a way to use digital ink to search information directly, referred to herein as digital ink based search. For example, as shown in FIGS. 15-18, Microsoft® Visio® shapes may be searched via digital ink input to a software program user interface panel 1502.

As described above, the unified digital ink recognizer 102 is built to recognize a user's input as a character (e.g., a Chinese character) or a custom item, which in this example corresponds to a Visio® shape. If as in the representations 1500 and 1600 of FIGS. 15 and 16, respectively, the digital ink is input such that it is interpreted as a Chinese character, then the Chinese character is used as a keyword to search the related Visio shapes. As can be seen in these examples, when the user handwrites a Chinese character "'电'" or "'烧'" for searching, then the related shapes whose keywords contain this Chinese character are returned as search result.

Figure 15:
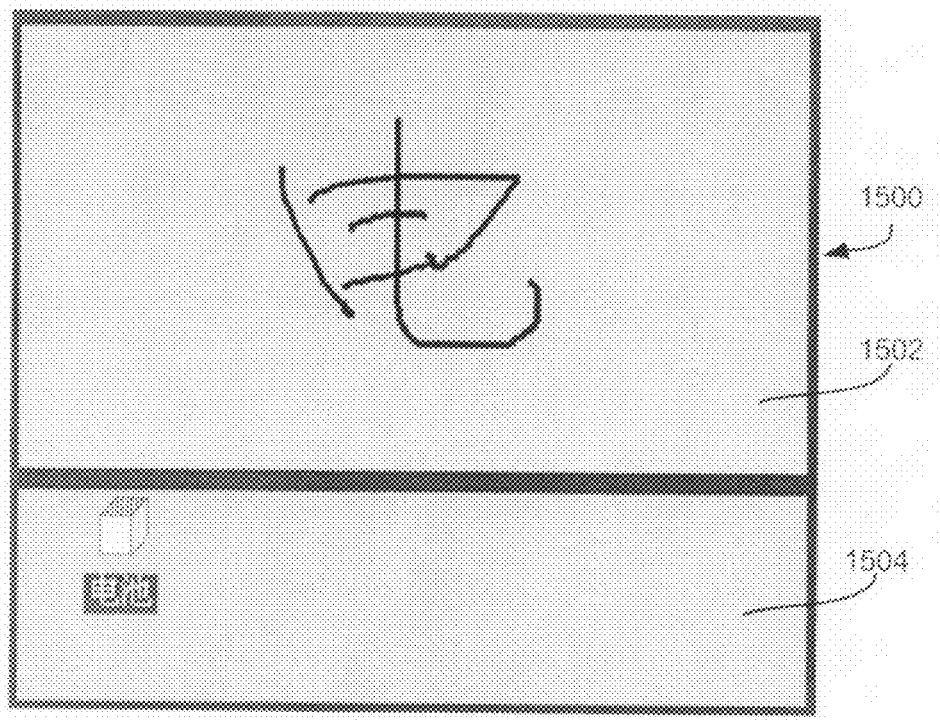
FIGS. 15-18 are representations of some example user input may be recognized and searched.
Figure 16:
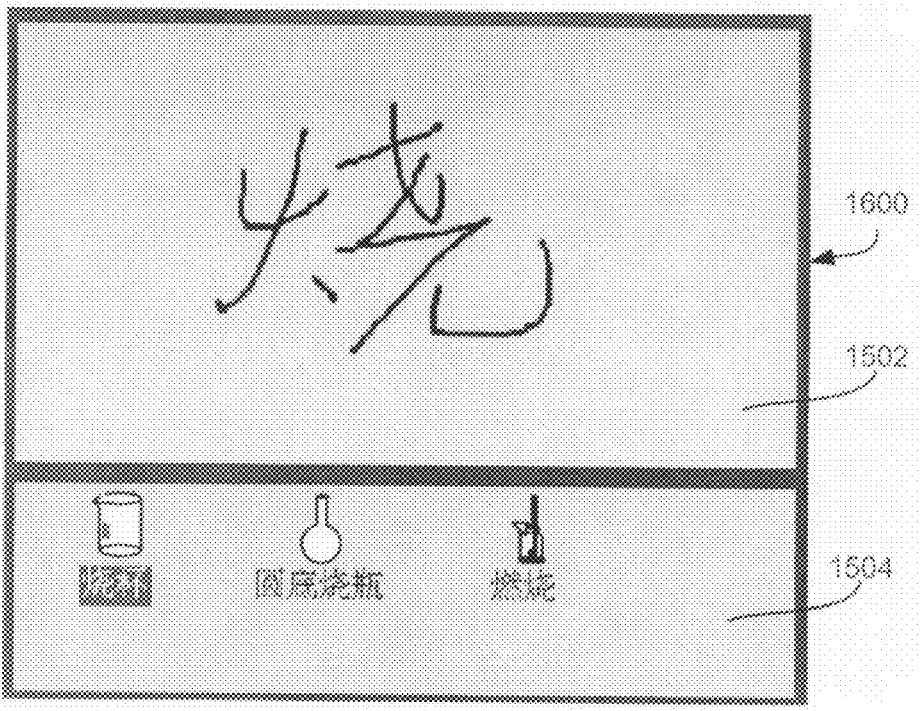

The search results are returned in the panel 1504 in FIGS. 15 and 16, respectively.

Figure 17:
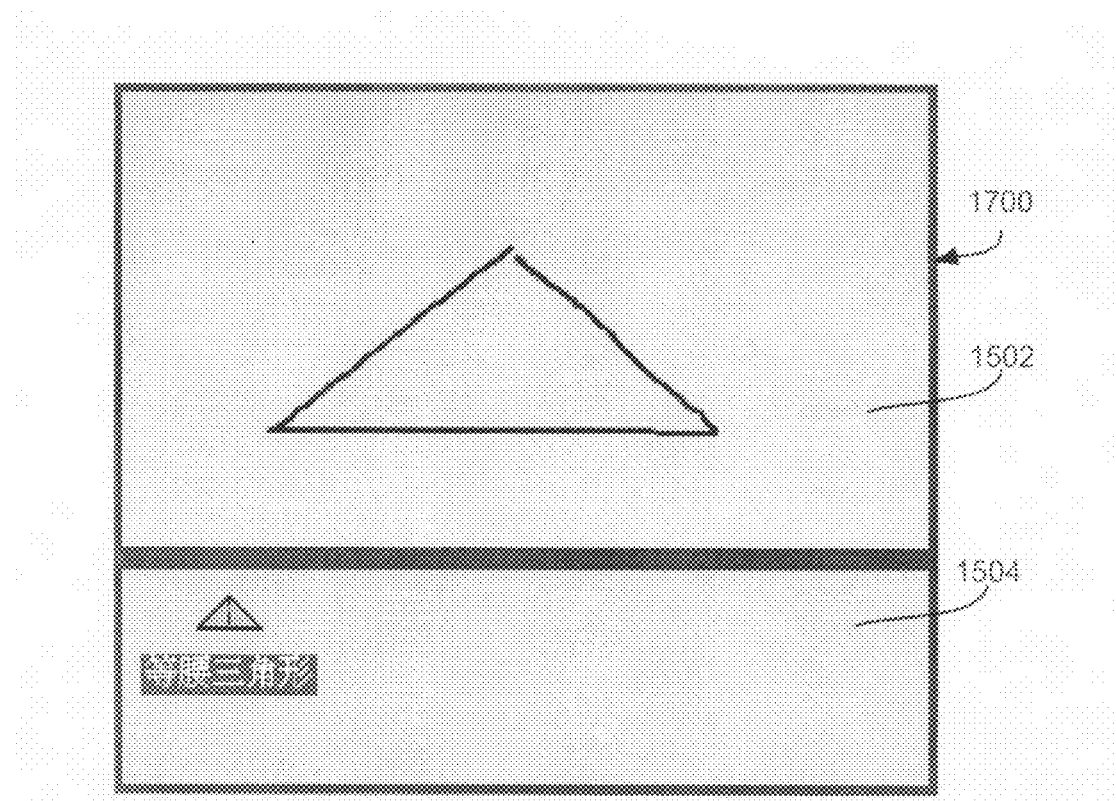
Figure 18:
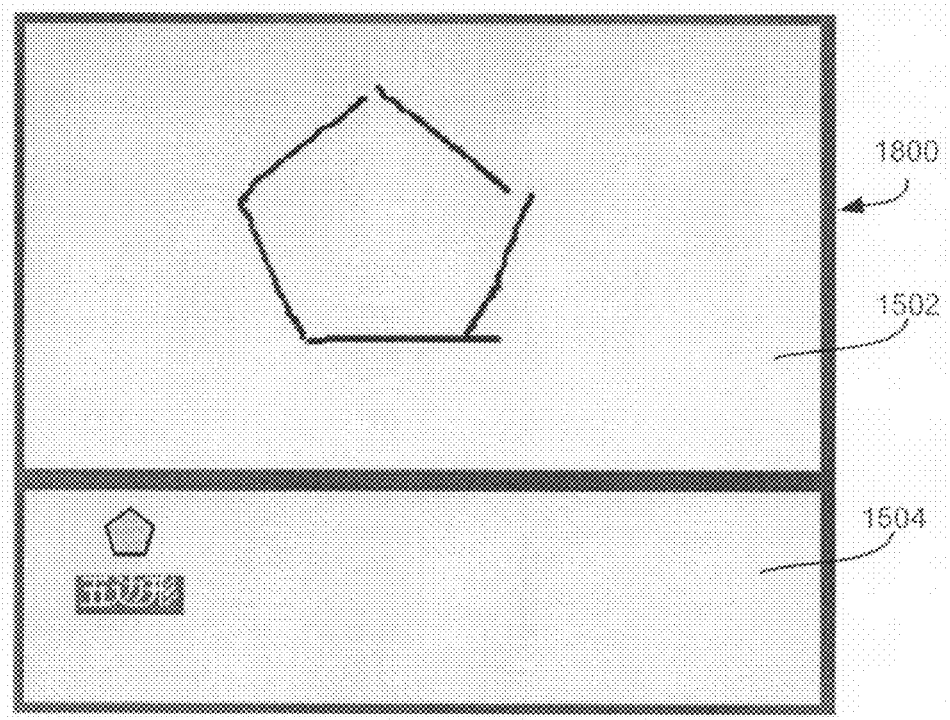

If instead as represented in the representations 1700 and 1800 of FIGS. 17 and 18, respectively, the input digital ink is interpreted as a shape, then the recognized shape may be used to provide the result directly. As can be seen in these examples, when the user sketches a triangle or polygon (e.g., pentagon) for searching, then the corresponding shape that the digital ink was recognized as is returned as a search result.

In general, the user may then drag a result from the results panel 1504 to the program into which the custom item (e.g., shape) is being input. However, other ways to handle the data are feasible. For example, note that in FIGS. 15, 17 and 18 only one recognition result is found for the user input; in such an event, rather than showing the single recognition result in a results panel 1504, the shape can be made to directly appear in the program to which shapes are being used. For example, a user may receive a pop-up input search panel by right-clicking while in the diagramming program at the location an inserted shape is desired, and the user may automatically have the single shape inserted at that location, or if multiple shapes are returned (FIG. 16) may select from among those shapes for insertion at that location. Alternatively, recognized characters can provide one or more shapes in a result panel, while directly recognized shapes can be automatically inserted.

Figure 19:
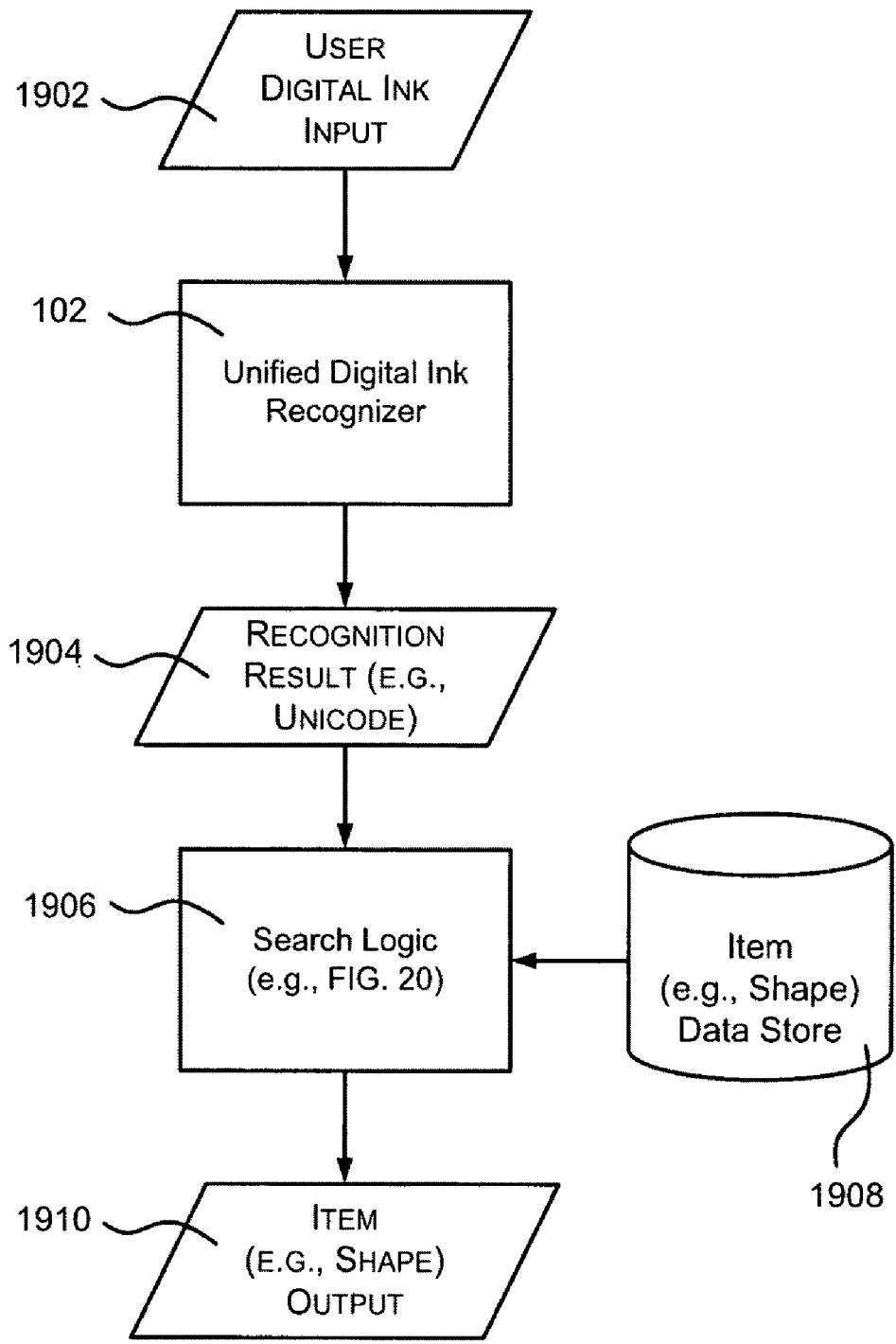
FIG. 19 is a block diagram representing example components for searching for custom items based on user input.

FIG. 19 is a block diagram representation of the general operation of digital ink based search, in which a user inputs data (data block 1902), such as into the input panel 1502. When the input is complete, (e.g., by explicit user request or after a pen-up event that starts a timer reaches a timeout threshold), the digital ink is sent to the unified digital ink recognizer 102, which produces a recognition result 1904.

Search logic 1906 (such as the logic exemplified in FIG. 20) then determines based on the recognition result (character or custom item) whether to perform a keyword search to return a result 1910, e.g., using an item (e.g., shape) data store 1908, or whether to directly return the corresponding item as a result 1910. Note that as used herein "directly" generally means without keyword searching, and does not necessarily mean that the Unicode value itself is returned to the panel and/or program into which the item is to be inserted, e.g., the Unicode value is typically first mapped to an image for outputting, and/or to a shape (object) identifier for the program in use. Mapping to an object identifier may occur with respect to a drag-and-drop operation or may be performed by the program itself.

Figure 20:
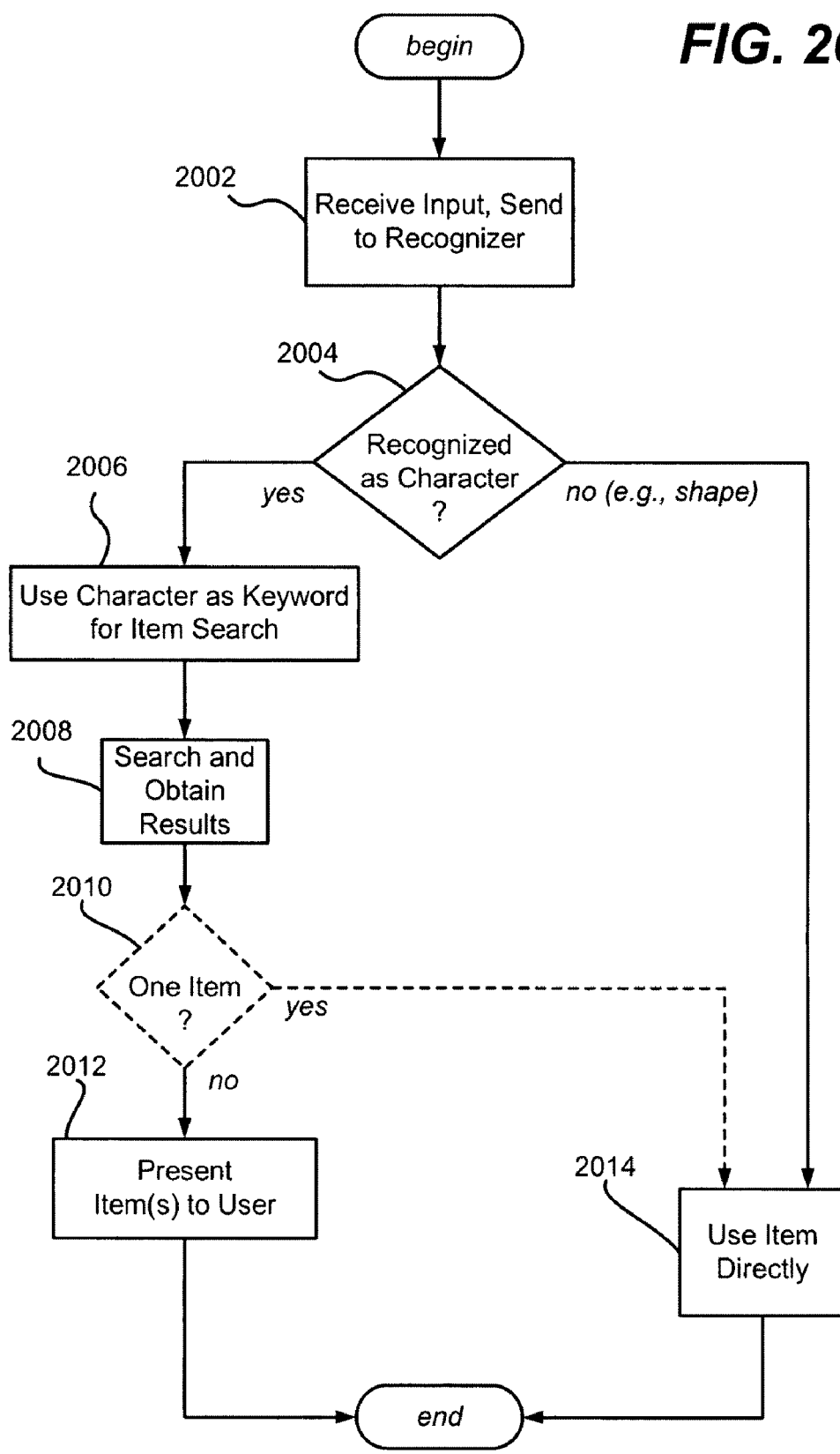
FIG. 20 is a flow diagram representing example logic for searching for custom items based on user input and providing a search result.

FIG. 20 provides example steps that may be taken by the search logic 1906 to produce an item (e.g., shape) result set based on a character or item recognition result. Step 2002 represents receiving the digital ink input to recognize, which may be a character or other (non-character) item.

If an item was recognized at step 2004, step 2004 branches to step 2014 where the item (e.g., shape) is used directly as output. As described above, the direct use may be an output to an output panel to present the item to the user, or into the program itself for which the item is desired; this may also include mapping the recognizer's returned value to another identifier.

If a character was recognized at step 2004, step 2004 branches to step 2006 where the character is used as a keyword (or to build a keyword) for searching, as described above. Step 2008 represents searching and obtaining the search results, with step 2012 representing presenting the found item or items to the user. Note that step 2010 is an optional step (as indicated by the dashed block and line) as described above, e.g., a single returned item found via a keyword search may be used directly such as by inserting it into the underlying program for which the search was requested and performed.

Exemplary Operating Environment

Figure 21:
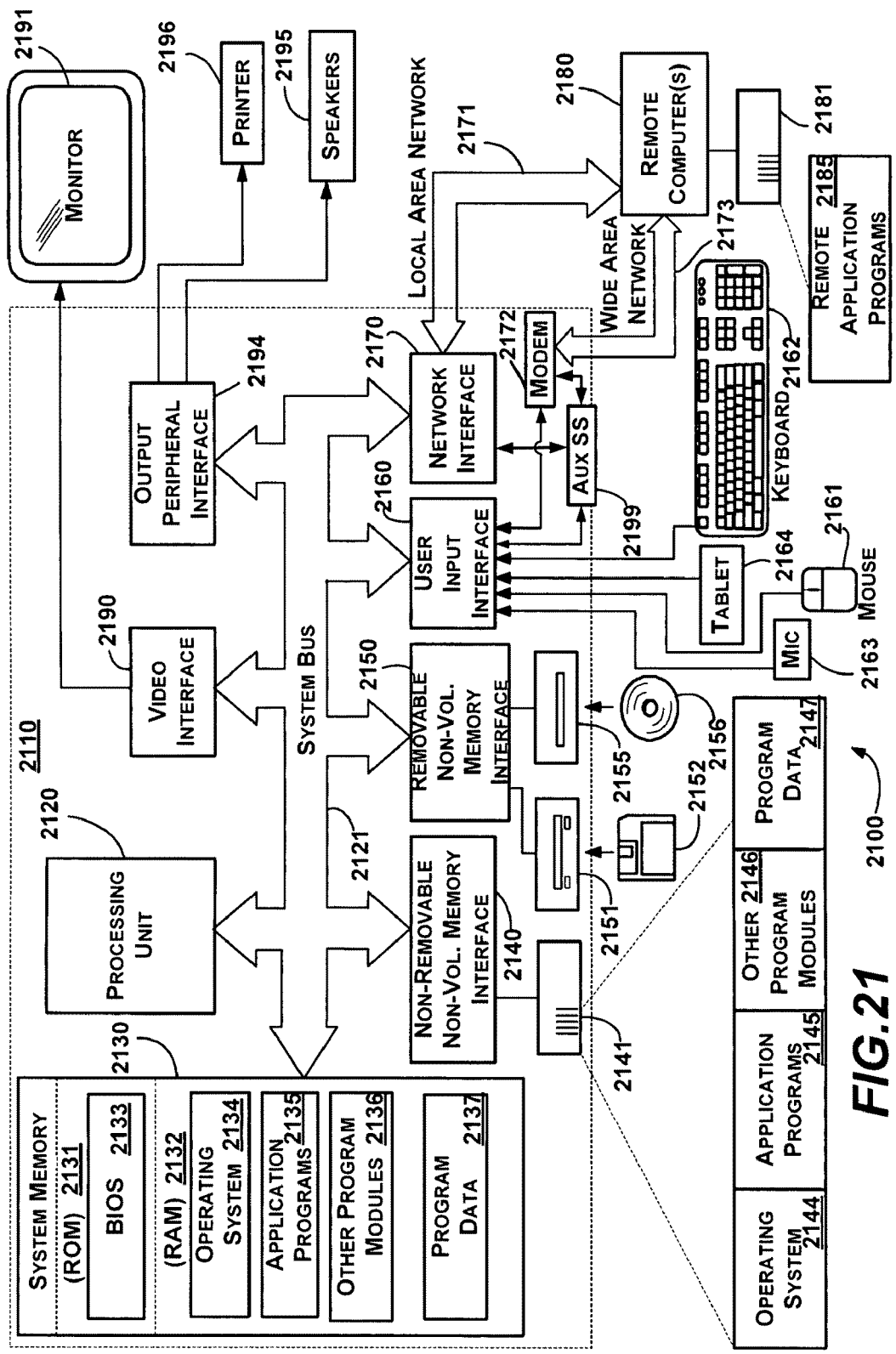
FIG. 21 shows an illustrative example of a general-purpose network computing environment into which various aspects of the present invention may be incorporated.

FIG. 21 illustrates an example of a suitable computing system environment 2100 on which the unified digital ink search of FIGS. 19 and 20 may be implemented. The computing system environment 2100 is only one example of a suitable computing environment and is not intended to suggest any limitation as to the scope of use or functionality of the invention. Neither should the computing environment 2100 be interpreted as having any dependency or requirement relating to any one or combination of components illustrated in the exemplary operating environment 2100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 21, an exemplary system for implementing various aspects of the invention may include a general purpose computing device in the form of a computer 2110. Components of the computer 2110 may include, but are not limited to, a processing unit 2120, a system memory 2130, and a system bus 2121 that couples various system components including the system memory to the processing unit 2120. The system bus 2121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 2110 typically includes a variety of computer-readable media. Computer-readable media can be any available media that can be accessed by the computer 2110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 2110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 2130 includes computer storage media in the form of volatile and/or nonvolatile memory such as read only memory (ROM) 2131 and random access memory (RAM) 2132. A basic input/output system 2133 (BIOS), containing the basic routines that help to transfer information between elements within computer 2110, such as during start-up, is typically stored in ROM 2131. RAM 2132 typically contains data and/or program modules that are immediately accessible to and/or presently being operated on by processing unit 2120. By way of example, and not limitation, FIG. 21 illustrates operating system 2134, application programs 2135, other program modules 2136 and program data 2137.

The computer 2110 may also include other removable/non-removable, volatile/nonvolatile computer storage media. By way of example only, FIG. 21 illustrates a hard disk drive 2141 that reads from or writes to non-removable, nonvolatile magnetic media, a magnetic disk drive 2151 that reads from or writes to a removable, nonvolatile magnetic disk 2152, and an optical disk drive 2155 that reads from or writes to a removable, nonvolatile optical disk 2156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2141 is typically connected to the system bus 2121 through a non-removable memory interface such as interface 2140, and magnetic disk drive 2151 and optical disk drive 2155 are typically connected to the system bus 2121 by a removable memory interface, such as interface 2150.

The drives and their associated computer storage media, described above and illustrated in FIG. 21, provide storage of computer-readable instructions, data structures, program modules and other data for the computer 2110. In FIG. 21, for example, hard disk drive 2141 is illustrated as storing operating system 2144, application programs 2145, other program modules 2146 and program data 2147. Note that these components can either be the same as or different from operating system 2134, application programs 2135, other program modules 2136, and program data 2137. Operating system 2144, application programs 2145, other program modules 2146, and program data 2147 are given different numbers herein to illustrate that, at a minimum, they are different copies. A user may enter commands and information into the computer 2110 through input devices such as a tablet, or electronic digitizer, 2164, a microphone 2163, a keyboard 2162 and pointing device 2161, commonly referred to as mouse, trackball or touch pad. Other input devices not shown in FIG. 21 may include a joystick, game pad, satellite dish, scanner, or the like. These and other input devices are often connected to the processing unit 2120 through a user input interface 2160 that is coupled to the system bus, but may be connected by other interface and bus structures, such as a parallel port, game port or a universal serial bus (USB). A monitor 2191 or other type of display device is also connected to the system bus 2121 via an interface, such as a video interface 2190. The monitor 2191 may also be integrated with a touch-screen panel or the like. Note that the monitor and/or touch screen panel can be physically coupled to a housing in which the computing device 2110 is incorporated, such as in a tablet-type personal computer. In addition, computers such as the computing device 2110 may also include other peripheral output devices such as speakers 2195 and printer 2196, which may be connected through an output peripheral interface 2194 or the like.

The computer 2110 may operate in a networked environment using logical connections to one or more remote computers, such as a remote computer 2180. The remote computer 2180 may be a personal computer, a server, a router, a network PC, a peer device or other common network node, and typically includes many or all of the elements described above relative to the computer 2110, although only a memory storage device 2181 has been illustrated in FIG. 21. The logical connections depicted in FIG. 21 include one or more local area networks (LAN) 2171 and one or more wide area networks (WAN) 2173, but may also include other networks. Such networking environments are commonplace in offices, enterprise-wide computer networks, intranets and the Internet.

When used in a LAN networking environment, the computer 2110 is connected to the LAN 2171 through a network interface or adapter 2170. When used in a WAN networking environment, the computer 2110 typically includes a modem 2172 or other means for establishing communications over the WAN 2173, such as the Internet. The modem 2172, which may be internal or external, may be connected to the system bus 2121 via the user input interface 2160 or other appropriate mechanism. A wireless networking component 2174 such as comprising an interface and antenna may be coupled through a suitable device such as an access point or peer computer to a WAN or LAN. In a networked environment, program modules depicted relative to the computer 2110, or portions thereof, may be stored in the remote memory storage device. By way of example, and not limitation, FIG. 21 illustrates remote application programs 2185 as residing on memory device 2181. It may be appreciated that the network connections shown are exemplary and other means of establishing a communications link between the computers may be used.

An auxiliary subsystem 2199 (e.g., for auxiliary display of content) may be connected via the user interface 2160 to allow data such as program content, system status and event notifications to be provided to the user, even if the main portions of the computer system are in a low power state. The auxiliary subsystem 2199 may be connected to the modem 2172 and/or network interface 2170 to allow communication between these systems while the main processing unit 2120 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage device comprising computer-executable instructions, which when executed by a processing unit, cause the processing unit to perform:
    receiving digital ink as input;
    providing the digital ink to a unified digital ink recognizer that recognizes the digital ink;
    receiving a recognition result from the unified digital ink recognizer;
    in a first instance when the recognition result corresponds to a character identified by the unified digital ink recognizer:
        using the character identified by the unified digital ink recognizer in a keyword search to locate one or more first corresponding non-character items each having a respective keyword that includes the character identified by the unified digital ink recognizer, and
        outputting each of the one or more first corresponding non-character items together with the respective keyword that includes the character identified by the unified digital ink recognizer;
    in a second instance when the recognition result corresponds to a second non-character item identified by the unified digital ink recognizer, outputting the second non-character item without keyword searching,
    wherein the one or more first corresponding non-character items and the second non-character item include shapes, gestures, or drawn pictures.

2. The computer-readable storage device of claim 1, wherein using the character in the keyword search in the first instance comprises building the keyword from the character and at least one other character.

3. The computer-readable storage device of claim 1, wherein the recognition result corresponds to the character and the outputting of the first instance comprises providing a visible representation of the one or more first corresponding non-character items and the keyword to a user interface result panel.

4. The computer-readable storage device of claim 1, wherein the outputting of the second instance comprises providing a visible representation of the second non-character item to a user interface result panel.

5. The computer-readable storage device of claim 1, wherein the outputting of the first instance comprises providing the one or more first corresponding non-character items to a software program that is being searched with the digital ink.

6. The computer-readable storage device of claim 1, wherein the outputting of the second instance comprises providing the second non-character item to a software program that is being searched with the digital ink.

7. The computer-readable storage device of claim 6, wherein the second non-character item comprises a value representing a second non-character shape, and wherein providing the second non-character item to the software program comprises mapping the value to an identifier of the second non-character shape as used in the software program.

8. A method comprising:
    receiving digital ink as input;
    providing the digital ink to a unified digital ink recognizer that recognizes the digital ink;
    receiving a recognition result from the unified digital ink recognizer;
    in a first instance when the recognition result corresponds to a character identified by the unified digital ink recognizer:
        using the character identified by the unified digital ink recognizer in a keyword search to locate one or more first corresponding non-character items each having a respective keyword that includes the character identified by the unified digital ink recognizer, and
        outputting each of the one or more first corresponding non-character items together with the respective keyword that includes the character identified by the unified digital ink recognizer;
    in a second instance when the recognition result corresponds to a second non-character item identified by the unified digital ink recognizer, outputting the second non-character item without keyword searching,
    wherein the one or more first corresponding non-character items and the second non-character item include shapes, gestures, or drawn pictures.

9. The method of claim 8, wherein using the character in the keyword search in the first instance comprises building the keyword from the character and at least one other character.

10. The method of claim 8, wherein the recognition result corresponds to the character and the outputting of the first instance comprises providing a visible representation of the one or more first corresponding non-character items and the keyword to a user interface result panel.

11. The method of claim 8, wherein the outputting of the second instance comprises providing a visible representation of the second non-character item to a user interface result panel.

12. The method of claim 8, wherein the outputting of the first instance comprises providing the one or more first corresponding non-character items to a software program that is being searched with the digital ink.

13. The method of claim 8, wherein the outputting of the second instance comprises providing the second non-character item to a software program that is being searched with the digital ink.

14. A system comprising:
an input mechanism configured to provide digital ink received as input to a unified digital ink recognizer that recognizes the digital ink;
a search logic configured to:
   receive a recognition result from the unified digital ink recognizer;
   in a first instance when the recognition result corresponds to a character identified by the unified digital ink recognizer:
      use the character identified by the unified digital ink recognizer in a keyword search to locate one or more first corresponding non-character items each having a respective keyword that includes the character identified by the unified digital ink recognizer, and
      output each of the one or more first corresponding non-character items together with the respective keyword that includes the character identified by the unified digital ink recognizer;
   in a second instance when the recognition result corresponds to a second non-character item identified by the unified digital ink recognizer, output the second non-character item without keyword searching; and
a processor configured to execute the search logic;
   wherein the one or more first corresponding non-character items and the second non-character item include shapes, gestures, or drawn pictures.

15. The system of claim 14, wherein the search logic is further configured to, in the first instance, build the keyword from the character and at least one other character.

16. The system of claim 14, wherein the search logic is further configured to, in the first instance, cause a visible representation of the one or more first corresponding non-character items and the keyword to appear on a user interface result panel.

17. The system of claim 14, wherein the search logic is further configured to, in the second instance, cause a visible representation of the second non-character item to appear on a user interface result panel.

18. The system of claim 14, wherein the search logic is further configured to, in the first instance, output the one or more first corresponding non-character items to a software program that is being searched with the digital ink.

19. The system of claim 14, wherein the search logic is further configured to, in the second instance, output the second non-character item to a software program that is being searched with the digital ink.

20. The system of claim 19, wherein the second non-character item comprises a value representing a second non-character shape, and wherein the search logic is configured to output the second non-character item to the software program by mapping the value to an identifier of the second non-character shape as used in the software program.

* * * * *